(12) United States Patent
Seidel et al.

(10) Patent No.: US 8,927,621 B2
(45) Date of Patent: *Jan. 6, 2015

(54) PROCESS FOR THE PREPARATION OF ABS COMPOSITIONS HAVING AN IMPROVED SURFACE AFTER STORAGE UNDER WARM MOIST CONDITIONS

(71) Applicant: Bayer Intellectual Property GmbH, Monheim (DE)

(72) Inventors: Andreas Seidel, Dormagen (DE); Eckhard Wenz, Cologne (DE); Hans-Juergen Klankers, Leverkusen (DE)

(73) Assignee: Bayer Intellectual Property GmbH, Monheim (DE)

( * ) Notice: Subject to any disclaimer, the term of this patent is extended or adjusted under 35 U.S.C. 154(b) by 6 days.

This patent is subject to a terminal disclaimer.

(21) Appl. No.: 13/866,860

(22) Filed: Apr. 19, 2013

(65) Prior Publication Data

US 2013/0281567 A1    Oct. 24, 2013

(30) Foreign Application Priority Data

Apr. 23, 2012 (EP) .................... 12165141

(51) Int. Cl.
*C08F 2/22* (2006.01)
*C08L 55/02* (2006.01)
*C08L 69/00* (2006.01)

(52) U.S. Cl.
CPC . *C08L 3/30* (2013.01); *C08L 55/02* (2013.01); *C08L 69/00* (2013.01)
USPC ........... 523/122; 264/259; 427/296; 524/117; 524/291; 524/311; 524/423

(58) Field of Classification Search
CPC ......... C08L 55/02; C08L 69/00; C08L 25/12; C08K 3/30; C08K 15/005; C08K 5/103; C08K 5/526
USPC ........... 523/122; 264/255; 427/296; 524/117, 524/291, 311, 423
See application file for complete search history.

(56) References Cited

U.S. PATENT DOCUMENTS

| 5,314,990 A | 5/1994 | Jansen et al. |
|---|---|---|
| 2010/0210789 A1 | 8/2010 | Seidel et al. |
| 2013/0281595 A1 * | 10/2013 | Seidel et al. ................. 524/423 |

FOREIGN PATENT DOCUMENTS

| EP | 0459161 A2 | 12/1991 |
|---|---|---|
| WO | 9828344 A1 | 7/1998 |
| WO | 2009071537 A2 | 6/2009 |
| WO | 2010094416 A1 | 8/2010 |

OTHER PUBLICATIONS

International Search Report of PCT/EP2013/058290 Dated Jul. 5, 2013.

* cited by examiner

*Primary Examiner* — Nathan M Nutter
(74) *Attorney, Agent, or Firm* — Miles & Stockbridge P.C.

(57) ABSTRACT

The present invention relates to a process for the preparation of compositions comprising vinyl aromatic copolymers prepared by the emulsion polymerisation process and having salt inclusions resulting from their preparation, which compositions are distinguished by an improved surface quality after storage under warm moist conditions and in that respect are suitable for the production of molded bodies having a class A surface.

15 Claims, No Drawings

PROCESS FOR THE PREPARATION OF ABS COMPOSITIONS HAVING AN IMPROVED SURFACE AFTER STORAGE UNDER WARM MOIST CONDITIONS

CROSS REFERENCE TO RELATED APPLICATION

This application claims priority to European Patent Application No. 12165141.8, filed Apr. 23, 2012, the contents of which is incorporated herein by reference in its entirety.

BACKGROUND

1. Field of the Invention

The present invention relates to a process for the preparation of compositions comprising vinyl aromatic copolymers prepared by the emulsion polymerisation process and having salt inclusions resulting from their preparation, which compositions are distinguished by an improved surface quality after storage under warm moist conditions and in that respect are suitable for the production of moulded bodies having an age-resistant defect-free class A surface.

The present invention relates in addition to the compositions prepared by the process according to the invention and to their use in the production of moulded bodies with a class-A-surface requirement and a partial or full high-gloss finish, which can optionally be subjected partially or completely to a further surface treatment step by, for example, painting, in-mould decoration, metallisation by vacuum deposition or galvanisation.

2. Description of Related Art

Compositions comprising vinyl aromatic copolymers prepared by the emulsion polymerisation process and having salt inclusions resulting from their preparation are known in the literature. Sources of such salt inclusions resulting from the preparation are many and varied, for example emulsifier solutions, polymerisation initiator solutions, buffer solutions and precipitating agent solutions which are used as auxiliary substances in the emulsion polymerisation process and which, depending on the process, remain in the material or are removed from the material again only incompletely upon working up of the polymer.

In particular, the precipitation of vinyl polymer latices prepared by emulsion polymerisation by means of the addition of acids and/or salts, which is generally carried out in traditional processes, such as, for example, in EP 459 161 B1, DE 2 021 398 and DE 28 15 098, contributes to a considerable extent to the salt content of the final polymer, because such salts can generally be removed from the product again by subsequent process steps (washing) only unsatisfactorily or with a high outlay (energy and water/waste water). There are used as coagulants, for example and preferably, aqueous solutions of water-soluble salts such as, for example, alkali, alkaline earth or aluminium chlorides, sulfates, nitrates, phosphates, acetates, formates, aluminates or carbonates, particularly preferably aluminium chloride, calcium chloride and magnesium sulfate solutions, optionally in combination with inorganic or organic acids such as, for example, hydrochloric acid, sulfuric acid, phosphoric acid, boric acid, formic acid, acetic acid, propionic acid and citric acid.

It is described in the literature that such salt inclusions in compositions comprising vinyl aromatic copolymers can lead to undesirable effects.

WO 2009/071537, for example, discloses that magnesium compounds and/or calcium compounds in impact-modified vinyl aromatic copolymers selected from the group of the acrylonitrile-butadiene-styrene copolymers (ABS), acrylonitrile-styrene-acrylate copolymers (ASA) and methacrylate-acrylonitrile-butadiene-styrene copolymers (MABS), optionally comprising polycarbonate and additives, lead to undesirable film formation on the moulding tool during thermoplastic shaping by means of injection moulding or extrusion, and claims in that respect such compositions having a content of magnesium compounds and/or calcium compounds of from 0 mg/kg to 100 mg/kg. The emulsion polymers used in those compositions are not precipitated by the addition of magnesium sulfate solution, as is traditionally conventional, but by freeze precipitation on a flake ice machine.

WO 98/28344 discloses a process for the continuous coagulation of aqueous dispersions of graft rubbers by means of shear, which process overcomes the known disadvantage of precipitation by means of acids and/or salts as coagulants that impurities often remain in the worked-up polymers which can lead to an impairment of the product properties.

A problem of thermoplastic compositions comprising vinyl aromatic copolymers prepared by the emulsion polymerisation process and having salt inclusions resulting from their preparation is that, when mouldings produced therefrom are exposed to moisture (for example condensation or atmospheric moisture), in particular at elevated temperatures, they have a tendency to form undesirable surface defects (blister formation), which restrict the use of such compositions in mouldings having a high-gloss finish and a class A surface requirement.

EP 2 398 842 A1 discloses a compounding process for the preparation of impact-modified polycarbonate compositions having a reduced content of volatile organic compounds, in which there are added to the pulverulent graft polymer used as impact modifier from 2 to 40 wt. %, based on the sum of impact modifier and water, of liquid water, and the premixture so prepared is used in the compounding of the impact-modified polycarbonate compositions. This process corresponds to a comparative example in this application.

SUMMARY

Accordingly, an object of the present invention was to provide a process which permits the preparation of thermoplastic compositions comprising vinyl aromatic copolymers prepared by the emulsion polymerisation process and having salt inclusions resulting from their preparation, which compositions are distinguished by an improved surface quality after storage under warm moist conditions and in that respect are suitable for the production of moulded bodies having an age-resistant, visually defect-free class A surface.

Within the context of the present invention, "visually defect-free class A surfaces" are to be understood as being surfaces which do not have any blisters of a number and diameter that are perceived as being disturbing with the naked eye. Preferably, such "visually defect-free class A surfaces" have a relative area of defects with blister topography, based on the surface area (Arel) studied, of less than 50 ppm, preferably of less than 30 ppm, particularly preferably of less than 20 ppm.

Furthermore, in a preferred embodiment such surfaces do not have blisters with a diameter greater than 300 μm.

However, such visually defect-free class A surfaces frequently nevertheless have blisters which are visible with optical aids, for example a magnifying glass or microscope. The relative area of defects with blister topography, based on the surface area (Arel) studied, is preferably from 0.1 to 50 ppm, particularly preferably from 1 to 30 ppm, most particularly preferably from 3 to 20 ppm. The maximum defect size, that is to say the diameter of the largest defects with blister topography that are found on such visually defect-free class A surfaces, is preferably in a range from 10 μm to 300 μm.

Surprisingly, it has now been found that the object is achieved by a process for the preparation of compositions comprising A) from 0 to 98 parts by weight, preferably from 1 to 95 parts by weight, in particular from 30 to 85 parts by weight, based on the sum of A and B, of a thermoplastic polymer other than B or of a mixture of a plurality of thermoplastic polymers other than B and B) from 2 to 100 parts by weight, preferably from 5 to 99 parts by weight, particularly preferably from 15 to 70 parts by weight, based on the sum of A and B, of B1) at least one graft polymer prepared by the emulsion polymerisation process, B2) optionally at least one graft polymer prepared by the mass, suspension or solution polymerisation process, B3) optionally at least one rubber-free vinyl (co)polymer, and C) from 0 to 30 parts by weight, preferably from 0.1 to 20 parts by weight, in particular from 0.3 to 7 parts by weight, based on the sum of A and B, of at least one commercially available polymer additive, wherein the sum of the parts by weight of A and B is 100, characterised in that (i) component B, preferably component B1 or a precompound of component B1 with at least one of components B2 and B3 or with a partial amount of at least one of components B2 and B3, particularly preferably a precompound of component B1 and the total amount or a partial amount of component B3, contains at least one inorganic salt consisting of a cation selected from the group of the alkali metals, alkaline earth metals and aluminium and an anion selected from the group consisting of chloride, sulfate, nitrate, phosphate, acetate and formate, in a concentration of the salt or of the salt mixture of from 100 to 5000 mg/kg, preferably from 150 to 2000 mg/kg, particularly preferably from 200 to 1000 mg/kg, based on the composition, and characterised in that a) in a first process step, the totality of the salt-containing component(s) is treated with water by contact with liquid water or, in an alternative and preferred embodiment, by exposure to a water-vapour-containing atmosphere with, in a preferred embodiment, a relative humidity of at least 40%, more preferably at least 70%, particularly preferably at least 90%, b) in a second process step, the component(s) so treated with water are melted and kneaded in the molten state, and c) optionally in a third process step, the component so prepared is mixed with the remaining components of the composition, the mixture is again melted and kneaded, and the components of the mixture are thereby dispersed in one another, wherein at least in one of steps b) or c) a low pressure of preferably at least 200 mbar, more preferably of at least 500 mbar, particularly preferably of at least 800 mbar, is applied and the water introduced into the process in process step a) is thereby removed from the product again.

DETAILED DESCRIPTION OF A PREFERRED EMBODIMENT

The relative humidity of the water-vapour-containing atmosphere is understood as being the percentage ratio of the water vapour concentration in the atmosphere and the water vapour saturation concentration under the particular ambient conditions in question (temperature and pressure). It is determined using a commercially available hygrometer, for example using an electric humidity sensor.

In an alternative and preferred embodiment, the totality of components A and C and the residual amounts of component B are added to the composition in process step (b) and dispersed into one another by the kneading operation, and the water introduced into the process in process step a) is removed from the product again by application of a low pressure of preferably at least 200 mbar, more preferably of at least 500 mbar, particularly preferably of at least 800 mbar.

In a last step d), the composition is generally then cooled again and granulated.

Preferably, the exposure time of the salt-containing component(s) B or of only the salt-containing component B 1, or of the salt-containing precompound of component B1 with at least one of components B2 and B3 or with a partial amount of at least one of components B2 and B3, to water or water vapour is at least 10 hours, preferably at least 20 hours, particularly preferably at least 40 hours. In an embodiment which is likewise preferred, the exposure time is not more than 500 hours, preferably not more than 200 hours, particularly preferably not more than 100 hours. Preferably, the salt-containing component(s) B, or only the salt-containing component B1, or the salt-containing precompound of component B1 with at least one of components B2 and B3 or with a partial amount of at least one of components B2 and B3, is used in the form of a granulate.

The treatment with liquid water can in principle take place in any type of unit, vessel, silo or container that is operated while open or closed. After contact with the liquid water for a period of time that is sufficient for complete penetration of the granulate grains, the granulate is strained in a preferred embodiment before being introduced into process step b) and then, in a further preferred embodiment, is dried, for example by blowing with preferably dry, optionally heated air, until residual amounts of liquid water remaining after the straining step and wetting the granulate grains are removed. This has the advantage of improving the metering ability of the granulates so treated into process steps b) and optionally c).

The treatment with a water-vapour-containing atmosphere can in principle likewise take place in any type of unit, vessel, silo or container. Suitable for this purpose are, for example, climate cabinets or air-conditioned silos. In a preferred industrial embodiment, the treatment with a water-vapour-containing atmosphere takes place in process-related units such as are known in principle from the prior art from the drying of plastics granulates or other materials. Examples which may be mentioned here are circulating air driers, which are continuously charged not with dry warm air but with water vapour or alternatively with optionally heated air to which water vapour has been added, or silos which are continuously charged countercurrently or in cross-flow relative to the flow of granulate with water vapour or alternatively with optionally heated air to which water vapour has been added.

Also preferably, the water content of the salt-containing component(s) B, or only of the salt-containing component B 1, or of the salt-containing precompound of component B1 with at least one of components B2 and B3 or with a partial amount of at least one of components B2 and B3, after process step a) is from 0.10 to 1.80 wt. %, yet more preferably from 0.15 to 1.50 wt. % and particularly preferably from 0.20 to 1.20 wt. %, based on component(s) B or the particular part-component(s) subjected to the treatment with water.

Preferably, the salt is an alkali, alkaline earth or aluminium chloride or an alkali, alkaline earth or aluminium sulfate or a mixture thereof; the salt is particularly preferably selected from the group consisting of aluminium chloride, calcium chloride and magnesium sulfate or mixtures thereof; the salt is most particularly preferably magnesium sulfate.

In a preferred embodiment, the composition consists only of components A, B and C.

In a further preferred embodiment, component B comprises at least two components selected from the group consisting of B1, B2 and B3, more preferably components B1 and B3, particularly preferably B1, B2 and B3.

The inorganic salt is preferably introduced into the composition by way of component B1, which preferably contains the salt as an impurity resulting from its preparation. Component B1 contains the salt preferably in a concentration of from 100 to 10,000 mg/kg, more preferably from 150 to 3000 mg/kg, particularly preferably from 200 to 1500 mg/kg, based on the composition.

The content of inorganic salt is determined via the anion contents of chloride, sulfate, nitrate, phosphate, acetate or formate, preferably chloride or sulfate, particularly preferably sulfate. Such a determination is carried out, after suitable decomposition of the material, by ion chromatography via conductivity measurement according to the method described in the examples for determining the magnesium sulfate content.

The treatment with liquid water preferably takes place in a temperature range of from 5 to 95° C., more preferably from 10 to 90° C. and particularly preferably from 20 to 85° C.

The treatment with a water-vapour-containing atmosphere preferably takes place in a temperature range of from 20 to 95° C., more preferably from 30 to 90° C. and particularly preferably from 40 to 85° C. The upper limit for the preferred ranges for the process temperatures in process step a) is given by the fact that, above 85° C., the granulates have an increasing tendency, as the temperature increases, to soften and thereby stick together, and their ability to be metered into the further process steps b) and optionally c) is accordingly impaired, or further process steps are necessary in order to bring the granulates into a meterable form again.

In a further preferred embodiment, the treatment with a water-vapour-containing atmosphere takes place at a temperature of from 20 to 95° C. and at a relative humidity of at least 70%, particularly preferably at a temperature of from 40 to 85° C. and at a relative humidity of at least 90%. Because of the high humidity and the high temperature, only a comparatively short exposure time is required, so that it is also possible to work above the softening point for a short time without the granules irreversibly sticking together.

Advantages of this process are, on the one hand, the simpler handling of component B and its constituents largely, and in a preferred embodiment solely, in the form of granulates as compared to powders, which tend to stick together and also have an explosive tendency, and, on the other hand, the possibility of using ABS in granulate form with a high salt content resulting from its preparation, without further complex purification steps such as washing or melt filtration, for the production of class-A-surface components.

Within the scope of the invention, "granulate" is understood as being a component or a mixture of a plurality of components that is present in the solid state of aggregation, wherein the solid particles have a particle size of at least 2 mm and generally not more than 10 mm. The granulate grains can have any desired shape, for example a lenticular shape, a spherical shape or a cylindrical shape.

Within the scope of the invention, "powder" or "pulverulent" is understood as being a component or a mixture of a plurality of components which is present in the solid state of aggregation and in which the particles have particle sizes of less than 2 mm, preferably of less than 1 mm, in particular of less than 0.5 mm.

Component A

There are suitable as component A in principle all types of thermoplastic polymers other than component B or mixtures of two or more than two such thermoplastic polymers.

Examples which may be mentioned here are polyolefins (such as polyethylene and polypropylene), thermoplastic polyurethanes, polyacetals (such as polyoxymethylene and polyphenylene ether), polyamides, polyimides, polycarbonates, polyesters, polyester carbonates, polysulfones, polyarylates, polyaryl ethers, polyphenylene ethers, polyarylsulfones, polyaryl sulfides, polyether sulfones, polyphenylene sulfide, polyether ketones, polyamide imides, polyether imides and polyester imides.

There is particularly preferably used as component A at least one polymer selected from the group consisting of polycarbonate, polyester carbonate and polyester, particularly preferably at least one polymer selected from the group consisting of aromatic polycarbonate, aromatic polyester carbonate and aromatic polyester, most particularly preferably a polymer selected from the group consisting of aromatic polycarbonate and aromatic polyester carbonate.

Aromatic polycarbonates and/or aromatic polyester carbonates according to component A which are suitable according to the invention are known in the literature or can be prepared by processes known in the literature (for the preparation of aromatic polycarbonates see, for example, Schnell, "Chemistry and Physics of Polycarbonates", Interscience Publishers, 1964 as well as DE-AS 1 495 626, DE-A 2 232 877, DE-A 2 703 376, DE-A 2 714 544, DE-A 3 000 610, DE-A 3 832 396; for the preparation of aromatic polyester carbonates see e.g. DE-A 3 077 934).

The preparation of aromatic polycarbonates is carried out, for example, by reaction of diphenols with carbonic acid halides, preferably phosgene, and/or with aromatic dicarboxylic acid dihalides, preferably benzenedicarboxylic acid dihalides, by the interfacial process, optionally using chain terminators, for example monophenols, and optionally using branching agents having a functionality of three or more than three, for example triphenols or tetraphenols. Preparation by a melt polymerisation process by reaction of diphenols with, for example, diphenyl carbonate is likewise possible.

Diphenols for the preparation of the aromatic polycarbonates and/or aromatic polyester carbonates are preferably those of formula (I)

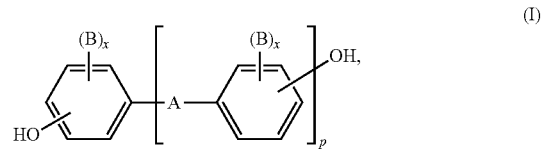

wherein

A represents a single bond, C1- to C5-alkylene, C2- to C5-alkylidene, C5- to C6-cycloalkylidene, —O—, —SO—, —CO—, —S—, —SO$_2$—, C6- to C12-arylene, to which there can be fused further aromatic rings optionally containing heteroatoms, or a radical of formula (II) or (III)

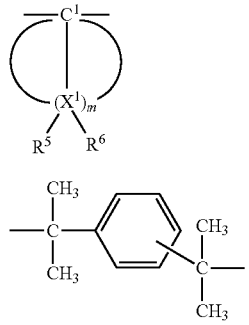

(II)

(III)

B in each case represents C1- to C12-alkyl, preferably methyl, halogen, preferably chlorine and/or bromine, x in each case independently of one another represents 0, 1 or 2, p represents 1 or 0, and R5 and R6 can be chosen individually for each X1 and, independently of one another, represent hydrogen or C1- to C6-alkyl, preferably hydrogen, methyl or ethyl, X1 represents carbon and m represents an integer from 4 to 7, preferably 4 or 5, with the proviso that on at least one atom X1, R5 and R6 are simultaneously alkyl.

Preferred diphenols are hydroquinone, resorcinol, dihydroxydiphenols, bis-(hydroxyphenyl)-C1-C5-alkanes, bis-(hydroxyphenyl)-C5-C6-cycloalkanes, bis-(hydroxyphenyl) ethers, bis-(hydroxy-phenyl) sulfoxides, bis-(hydroxyphenyl) ketones, bis-(hydroxyphenyl)-sulfones and α,α-bis-(hydroxy-phenyl)-diisopropyl-benzenes as well as derivatives thereof brominated and/or chlorinated on the ring.

Particularly preferred diphenols are 4,4'-dihydroxydiphenyl, bisphenol A, 2,4-bis(4-hydroxy-phenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenylsulfone as well as di- and tetra-brominated or chlorinated derivatives thereof, such as, for example, 2,2-bis(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. Particular preference is given to 2,2-bis-(4-hydroxyphenyl)-propane (bisphenol A).

The diphenols can be used individually or in the form of arbitrary mixtures. The diphenols are known in the literature or are obtainable by processes known in the literature.

Chain terminators suitable for the preparation of the thermoplastic, aromatic polycarbonates are, for example, phenol, p-chlorophenol, p-tert-butylphenol or 2,4,6-tribromophenol, but also long-chained alkylphenols, such as 4-[2-(2,4,4-trimethylpentyl)]-phenol, 4-(1,3-tetramethylbutyl)-phenol according to DE-A 2 842 005 or monoalkylphenol or dialkylphenols having a total of from 8 to 20 carbon atoms in the alkyl substituents, such as 3,5-di-tert-butylphenol, p-isooctylphenol, p-tert-octylphenol, p-dodecylphenol and 2-(3,5-dimethylheptyl)-phenol and 4-(3,5-dimethylheptyl)-phenol. The amount of chain terminators to be used is generally from 0.5 mol % to 10 mol %, based on the molar sum of the diphenols used in each particular case.

The thermoplastic, aromatic polycarbonates have mean weight-average molecular weights (Mw, measured by gel permeation chromatography in methylene chloride at 25° C. with polycarbonate as standard) of from 20,000 to 40,000 g/mol, preferably from 22,000 to 35,000 g/mol, particularly preferably from 24,000 to 32,000 g/mol.

The thermoplastic, aromatic polycarbonates can be branched in known manner, preferably by the incorporation of from 0.05 to 2.0 mol %, based on the sum of the diphenols used, of compounds having a functionality of three or more than three, for example those having three or more phenolic groups.

Both homopolycarbonates and copolycarbonates are suitable. For the preparation of copolycarbonates of component A according to the invention, from 1 to 25 wt. %, preferably from 2.5 to 25 wt. %, based on the total amount of diphenols to be used, of polydiorganosiloxanes having hydroxyaryloxy end groups can also be used. These are known (U.S. Pat. No. 3,419,634) and can be prepared by processes known in the literature. The preparation of copolycarbonates containing polydiorganosiloxanes is described in DE-A 3 334 782.

Preferred polycarbonates, in addition to the bisphenol A homopolycarbonates, are the copolycarbonates of bisphenol A having up to 15 mol %, based on the molar sums of diphenols, of diphenols other than those mentioned as being preferred or particularly preferred, in particular 2,2-bis(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and naphthalene-2,6-dicarboxylic acid.

Particular preference is given to mixtures of the diacid dichlorides of isophthalic acid and terephthalic acid in a ratio of from 1:20 to 20:1.

In the preparation of polyester carbonates a carbonic acid halide, preferably phosgene, is additionally used concomitantly as bifunctional acid derivative.

There come into consideration as chain terminators for the preparation of the aromatic polyester carbonates, in addition to the monophenols already mentioned, also the chlorocarbonic acid esters thereof as well as the acid chlorides of aromatic monocarboxylic acids, which can optionally be substituted by C1- to C22-alkyl groups or by halogen atoms, as well as aliphatic C2- to C22-monocarboxylic acid chlorides.

The amount of chain terminators is in each case from 0.1 to 10 mol %, based in the case of phenolic chain terminators on moles of diphenol and in the case of monocarboxylic acid chloride chain terminators on moles of dicarboxylic acid dichloride.

The aromatic polyester carbonates can also contain aromatic hydroxycarboxylic acids incorporated therein.

The aromatic polyester carbonates can be both linear and branched in a known manner (see in this connection DE-A 2 940 024 and DE-A 3 007 934).

There can be used as branching agents, for example, carboxylic acid chlorides having a functionality of three or more, such as trimesic acid trichloride, cyanuric acid trichloride, 3,3'-4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol % (based on dicarboxylic acid dichlorides used), or phenols having a functionality of three or more, such as phloroglucinol, 4,6-dimethyl-2,4,6-tri-(4-hydroxyphenyl)-hept-2-ene, 4,6-dimethyl-2, 4-6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxy-phenyl)-cyclohexyl]-propane, 2,4-bis(4-hydroxyphenyl-isopropyl)-phenol, tetra-(4-hydroxyphenyl)-methane, 2,6-bis(2- hydroxy-5-methyl-benzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxytri-phenyl)-methyl]-benzene, in amounts of from 0.01 to 1.0 mol %, based on diphenols used. Phenolic branching agents can be placed in a reaction vessel with the diphenols, acid chloride branching agents can be introduced together with the acid dichlorides.

The amount of carbonate structural units in the thermoplastic, aromatic polyester carbonates can vary as desired. Preferably, the amount of carbonate groups is up to 100 mol %, in particular up to 80 mol %, particularly preferably up to 50 mol %, based on the sum of ester groups and carbonate groups. Both the esters and the carbonates contained in the aromatic polyester carbonates can be present in the polycondensation product in the form of blocks or distributed randomly.

The thermoplastic, aromatic polycarbonates and polyester carbonates can be used alone or in an arbitrary mixture.

Component B1

Component B1 is graft polymers, prepared by the emulsion polymerisation process, of, in a preferred embodiment, B1.1) from 5 to 95 wt. %, preferably from 10 to 70 wt. %, particularly preferably from 20 to 60 wt. %, based on component B1, of a mixture of B1.1.1) from 65 to 85 wt. %, preferably from 70 to 80 wt. %, based on B1.1, of at least one monomer selected from the group of the vinyl aromatic compounds (such as, for example, styrene, a-methylstyrene), vinyl aromatic compounds substituted on the ring (such as, for example, p-methylstyrene, p-chlorostyrene) and methacrylic acid (C1-C8)-alkyl esters (such as, for example, methyl methacrylate, ethyl methacrylate) and B1.1.2) from 15 to 35 wt. %, preferably from 20 to 30 wt. %, based on B1.1, of at least one monomer selected from the group of the vinyl cyanides (such as, for example, unsaturated nitriles such as acrylonitrile and methacrylonitrile), (meth)acrylic acid (C1-C8)-alkyl esters (such as, for example, methyl methacrylate, n-butyl acrylate, tert-butyl acrylate) and derivatives (such as, for example, anhydrides and imides) of unsaturated carboxylic acids (for example maleic anhydride and N-phenyl-maleimide)

on

B1.2) from 95 to 5 wt. %, preferably from 90 to 30 wt. %, particularly preferably from 80 to 40 wt. %, based on component B1, of at least one elastomeric graft base.

The graft base preferably has a glass transition temperature <0° C., more preferably <−20° C., particularly preferably <−60° C.

Unless indicated otherwise in the present invention, glass transition temperatures are determined by means of differential scanning calorimetry (DSC) according to standard DIN EN 61006 at a heating rate of 10 K/min with definition of the Tg as the mid-point temperature (tangent method) and nitrogen as protecting gas.

The graft particles in component B1 preferably have a mean particle size (D50 value) of from 0.05 to 5 μm, preferably from 0.1 to 1.0 μm, particularly preferably from 0.2 to 0.5 μm.

The mean particle size D50 is the diameter above and below which in each case 50 wt. % of the particles lie. Unless explicitly indicated otherwise in the present application, it is determined by means of ultracentrifuge measurement (W. Scholtan, H. Lange, Kolloid, Z. and Z. Polymere 250 (1972), 782-1796).

Preferred monomers B1.1.1 are selected from at least one of the monomers styrene, α-methylstyrene and methyl methacrylate; preferred monomers B1.1.2 are selected from at least one of the monomers acrylonitrile, maleic anhydride and methyl methacrylate.

Particularly preferred monomers are B 1.1.1 styrene and B 1.1.2 acrylonitrile.

Graft bases B 1.2 suitable for the graft polymers B1 are, for example, diene rubbers, diene-vinyl block copolymer rubbers, EP(D)M rubbers, that is to say those based on ethylene/propylene and optionally diene, acrylate, polyurethane, silicone, chloroprene, ethylene/vinyl acetate rubbers as well as mixtures of such rubbers, or silicone-acrylate composite rubbers, in which the silicone and acrylate components are linked chemically to one another (e.g. by grafting).

Preferred graft bases B 1.2 are diene rubbers (e.g. based on butadiene or isoprene), diene-vinyl block copolymer rubbers (e.g. based on butadiene and styrene blocks), copolymers of diene rubbers with further copolymerisable monomers (e.g. according to B 1.1.1 and B 1.1.2) and mixtures of the above-mentioned types of rubbers. Pure polybutadiene rubber and styrene-butadiene block copolymer rubber are particularly preferred.

The gel content of the graft polymers is at least 40 wt. %, preferably at least 60 wt. %, particularly preferably at least 75 wt. % (measured in acetone).

Unless indicated otherwise in the present invention, the gel content of the graft polymers is determined at 25° C. as the fraction that is insoluble in acetone as solvent (M. Hoffmann, H. Krömer, R. Kuhn, Polymeranalytik I and II, Georg Thieme-Verlag, Stuttgart 1977).

The graft polymers B1 are prepared by radical polymerisation.

The graft polymer B1 generally comprises, resulting from its preparation, free copolymer of B1.1.1 and B1.1.2, that is to say copolymer that is not chemically bonded to the rubber base, which is distinguished in that it can be dissolved in suitable solvents (e.g. acetone).

Component B1 preferably comprises a free copolymer of B1.1.1 and B1.1.2 which has a weight-average molecular weight (Mw), determined by gel permeation chromatography with polystyrene as standard, of preferably from 30,000 to 150,000 g/mol, particularly preferably from 40,000 to 120,000 g/mol.

Component B2

The compositions according to the invention can optionally contain as component B2 graft polymers prepared by the mass, solution or suspension polymerisation process. In a preferred embodiment, such graft polymers are graft polymers of B2.1) from 5 to 95 wt. %, preferably from 80 to 93 wt. %, particularly preferably from 85 to 92 wt. %, most particularly preferably from 87 to 93 wt. %, based on component B2, of a mixture of B2.1.1) from 65 to 85 wt. %, preferably from 70 to 80 wt. %, based on the mixture B.2.1, of at least one monomer selected from the group of the vinyl aromatic compounds (such as, for example, styrene, α-methylstyrene), vinyl aromatic compounds substituted on the ring (such as, for example, p-methylstyrene, p-chlorostyrene) and methacrylic acid (C1-C8)-alkyl esters (such as, for example, methyl methacrylate, ethyl methacrylate) and B2.1.2) from 15 to 35 wt. %, preferably from 20 to 30 wt. %, based on the mixture B2.1, of at least one monomer selected from the group of the vinyl cyanides (such as, for example, unsaturated nitriles such as acrylonitrile and methacrylonitrile), (meth)acrylic acid (C1-C8)-alkyl esters (such as, for example, methyl methacrylate, n-butyl acrylate, tert-butyl acrylate) and derivatives (such as, for example, anhydrides and imides) of unsaturated carboxylic acids (for example maleic anhydride and N-phenyl-maleimide) on B2.2) from 95 to 5 wt. %, preferably from 20 to 7 wt. %, particularly preferably from 15 to 8 wt. %, most particularly preferably from 13 to 7 wt. %, based on component B2, of at least one graft base, The graft base preferably has a glass transition temperature <0° C., more preferably <−20° C., particularly preferably <−60° C.

The graft particles in component B2 preferably have a mean particle size (D50 value) of from 0.1 to 10 µm, preferably from 0.2 to 2 µm, particularly preferably from 0.3 to 1.0 µm, most particularly preferably from 0.3 to 0.6 µm.

Preferred monomers B2.1.1 are selected from at least one of the monomers styrene, a-methylstyrene and methyl methacrylate; preferred monomers B2.1.2 are selected from at least one of the monomers acrylonitrile, maleic anhydride and methyl methacrylate.

Particularly preferred monomers are B2.1.1 styrene and B2.1.2 acrylonitrile.

Graft bases B2.2 suitable for the graft polymers B2 are, for example, diene rubbers, diene-vinyl block copolymer rubbers, EP(D)M rubbers, that is to say those based on ethylene/propylene and optionally diene, acrylate, polyurethane, silicone, chloroprene, ethylene/vinyl acetate rubbers as well as mixtures of such rubbers, or silicone-acrylate composite rubbers, in which the silicone and acrylate components are linked chemically to one another (e.g. by grafting).

Preferred graft bases B2.2 are diene rubbers (e.g. based on butadiene or isoprene), diene-vinyl block copolymer rubbers (e.g. based on butadiene and styrene blocks), copolymers of diene rubbers with further copolymerisable monomers (e.g. according to B2.1.1 and B2.1.2) and mixtures of the above-mentioned types of rubbers. Styrene-butadiene block copolymer rubbers and mixtures of styrene-butadiene block copolymer rubbers with pure polybutadiene rubber are particularly preferred as the graft base B2.2.

The gel content of the graft polymers B2 is preferably from 10 to 35 wt. %, particularly preferably from 15 to 30 wt. %, most particularly preferably from 17 to 23 wt. % (measured in acetone).

Particularly preferred polymers B2 are, for example, ABS polymers prepared by radical polymerisation, which in a preferred embodiment comprise up to 10 wt. %, particularly preferably up to 5 wt. %, particularly preferably from 2 to 5 wt. %, in each case based on the graft polymer B2, of n-butyl acrylate.

The graft polymer B2 generally comprises, resulting from its preparation, free copolymer of B2.1.1 and B2.1.2, that is to say copolymer that is not chemically bonded to the rubber base, which is distinguished in that it can be dissolved in suitable solvents (e.g. acetone).

Component B2 preferably comprises a free copolymer of B2.1.1 and B2.1.2 which has a weight-average molecular weight (Mw), determined by gel permeation chromatography with polystyrene as standard, of preferably from 50,000 to 200,000 g/mol, particularly preferably from 70,000 to 1500,000 g/mol, particularly preferably from 80,000 to 120,000 g/mol.

Component B3

The composition can optionally comprise as a further component B3 (co)polymers of at least one monomer from the group of the vinyl aromatic compounds, vinyl cyanides (unsaturated nitriles), (meth)acrylic acid (C1-C8)-alkyl esters, unsaturated carboxylic acids and derivatives (such as anhydrides and imides) of unsaturated carboxylic acids.

Particularly suitable as component B3 are (co)polymers of B3.1 from 50 to 99 wt. %, preferably from 65 to 85 wt. %, particularly preferably from 70 to 80 wt. %, based on the (co)polymer B3, of at least one monomer selected from the group of the vinyl aromatic compounds (such as, for example, styrene, α-methylstyrene), vinyl aromatic compounds substituted on the ring (such as, for example, p-methylstyrene, p-chlorostyrene) and (meth)acrylic acid (C1-C8)-alkyl esters (such as, for example, methyl methacrylate, n-butyl acrylate, tert-butyl acrylate) and B3.2 from 1 to 50 wt. %, preferably from 15 to 35 wt. %, particularly preferably from 20 to 30 wt. %, based on the (co)polymer B3, of at least one monomer selected from the group of the vinyl cyanides (such as, for example, unsaturated nitriles such as acrylonitrile and methacrylonitrile), (meth) acrylic acid (C1-C8)-alkyl esters (such as, for example, methyl methacrylate, n-butyl acrylate, tert-butyl acrylate) unsaturated carboxylic acids and derivatives of unsaturated carboxylic acids (for example maleic anhydride and N-phenyl-maleimide).

These (co)polymers B3 are resin-like, thermoplastic and rubber-free. The copolymer of B3.1 styrene and B3.2 acrylonitrile is particularly preferred.

Such (co)polymers B3 are known and can be prepared by radical polymerisation, in particular by emulsion, suspension, solution or mass polymerisation.

The (co)polymers B3 have a weight-average molecular weight (Mw), determined by gel permeation chromatography with polystyrene as standard, of preferably from 50,000 to 200,000 g/mol, particularly preferably from 70,000 to 150,000 g/mol, particularly preferably from 80,000 to 130,000 g/mol.

Component C

The composition can further optionally comprise as component C commercially available polymer additives.

Suitable commercially available polymer additives according to component C are additives such as, for example, flameproofing agents (for example phosphorus compounds or halogen compounds), flameproofing synergists (for example nano-scale metal oxides), smoke-inhibiting additives (for example boric acid or borates), antidripping agents (for example compounds of the substance classes of the fluorinated polyolefins, the silicones and also aramid fibres), internal and external lubricants and demoulding agents (for example pentaerythritol tetrastearate, Montan wax or polyethylene wax), flowability aids (for example low molecular weight vinyl (co)polymers), antistatics (for example block copolymers of ethylene oxide and propylene oxide, other polyethers or polyhydroxy ethers, polyether amides, polyester amides or sulfonic acid salts), conductivity additives (for example conductive black or carbon nanotubes), stabilisers (for example UV/light stabilisers, heat stabilisers, antioxidants, transesterification inhibitors, hydrolytic stabilisers), additives having antibacterial action (for example silver or silver salts), additives that improve scratch resistance (for example silicone oils or hard fillers such as (hollow) ceramics beads or quartz powder), IR absorbers, optical brighteners, fluorescent additives, fillers and reinforcing materials (e.g. talc, ground glass fibres or carbon fibres, (hollow) glass or ceramics beads, mica, kaolin, CaCO3 and glass flakes), acids as well as colourants and pigments (for example carbon black, titanium dioxide or iron oxide) or mixtures of a plurality of the mentioned additives.

In a preferred embodiment, the compositions according to the invention comprise as component C at least one component selected from each of the groups of the demoulding agents and stabilisers. In a particularly preferred embodiment, pentaerythritol tetrastearate is used as the demoulding agent. In a particularly preferred embodiment, at least one compound selected from the group of the sterically hindered phenols, the organic phosphites and the Brönstedt acids is used as the stabiliser.

The compositions according to the invention can comprise as component C in particular also flameproofing agents, for example halogenated organic compounds or phosphorus-containing flameproofing agents. The last-mentioned are preferably used.

Phosphorus-containing flameproofing agents within the scope of the invention are preferably selected from the groups of the monomeric and oligomeric phosphoric and phosphonic acid esters, phosphonate amines and phosphazenes, it also being possible to use as flameproofing agents mixtures of a plurality of compounds selected from one or various of these groups. Other halogen-free phosphorus compounds not mentioned specifically here can also be used alone or in any desired combination with other halogen-free phosphorus compounds.

Preferred monomeric and oligomeric phosphoric or phosphonic acid esters are phosphorus compounds of the general formula (IV)

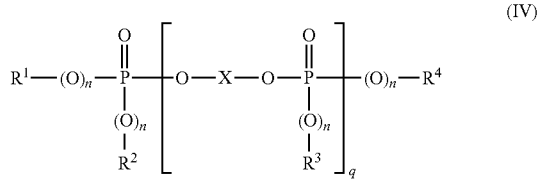

(IV)

wherein

R1, R2, R3 and R4, independently of one another, each represent optionally halogenated C1- to C8-alkyl, or C5- to C6-cycloalkyl, C6- to C20-aryl or C7- to C12-aralkyl each optionally substituted by alkyl, preferably C1- to C4-alkyl, and/or by halogen, preferably chlorine, bromine, each of the substituents n independently of the others represents 0 or 1, q represents from 0 to 30 and X represents a mono- or poly-nuclear aromatic radical having from 6 to 30 carbon atoms, or a linear or branched aliphatic radical having from 2 to 30 carbon atoms which can be OH-substituted and can contain up to 8 ether bonds.

R1, R2, R3 and R4, independently of one another, preferably represent C1- to C4-alkyl, phenyl, naphthyl or phenyl-C1-C4-alkyl. The aromatic groups R1, R2, R3 and R4 can in turn be substituted by halogen and/or by alkyl groups, preferably chlorine, bromine and/or C1- to C4-alkyl. Particularly preferred aryl radicals are cresyl, phenyl, xylenyl, propylphenyl or butylphenyl and the corresponding brominated and chlorinated derivatives thereof.

X in formula (IV) preferably represents a mono- or poly-nuclear aromatic radical having from 6 to 30 carbon atoms. This radical is preferably derived from diphenols of formula (I).

The substituents n in formula (IV), independently of one another, can be 0 or 1; n is preferably 1.

q represents values from 0 to 30. Where mixtures of different components of formula (IV) are used, mixtures preferably number-average q values of from 0.3 to 10, particularly preferably from 0.5 to 10, in particular from 1.05 to 1.4, can be used.

X particularly preferably represents

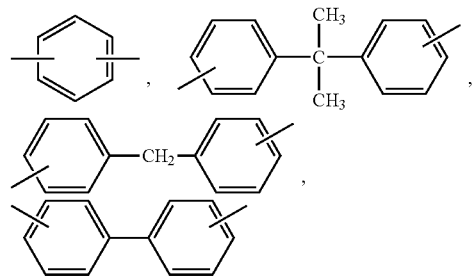

or chlorinated or brominated derivatives thereof. X is derived in particular from resorcinol, hydroquinone, bisphenol A or diphenylphenol. X is particularly preferably derived from bisphenol A.

The use of oligomeric phosphoric acid esters of formula (IV) which are derived from bisphenol A is particularly advantageous because the compositions provided with this phosphorus compound exhibit particularly high stress cracking resistance and hydrolytic stability and a particularly low tendency to film formation during processing by injection moulding. Furthermore, particularly high heat distortion resistance can be achieved with such flameproofing agents.

There can be used as component C according to the invention monophosphates (q=0), oligophosphates (q=1-30) or mixtures of mono- and oligo-phosphates.

Monophosphorus compounds of formula (IV) are in particular tributyl phosphate, tris-(2-chloroethyl)phosphate, tris-(2,3-dibromopropyl) phosphate, triphenyl phosphate, tricresyl phosphate, diphenylcresyl phosphate, diphenyloctyl phosphate, diphenyl-2-ethylcresyl phosphate, tri-(isopropylphenyl)phosphate, halo-substituted aryl phosphates, methylphosphonic acid dimethyl ester, methyl-phosphenic acid diphenyl ester, phenylphosphonic acid diethyl ester, triphenylphosphine oxide or tricresylphosphine oxide.

The phosphorus compounds according to formula (IV) are known (see e.g. EP-A 363 608, EP-A 640 655) or can be prepared by known methods in an analogous manner (e.g. Ullmanns Enzyklopädie der technischen Chemie, Vol. 18, p. 301 ff. 1979; Houben-Weyl, Methoden der organischen Chemie, Vol. 12/1, p. 43; Beilstein Vol. 6, p. 177).

The mean q values can be determined by determining the composition of the phosphate mixture (molecular weight distribution) by means of a suitable method (gas chromatography (GC), high pressure liquid chromatography (HPLC), gel permeation chromatography (GPC)) and calculating the mean values for q therefrom.

Phosphonate amines are preferably compounds of formula (V)

A3-y-NB1y (V)

wherein

A represents a radical of formula (Va)

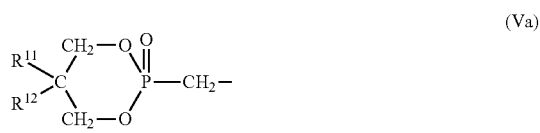

(Va)

or (Vb)

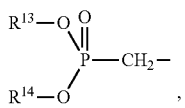

R11 and R12 independently of one another represent unsubstituted or substituted C1-C10-alkyl or unsubstituted or substituted C6- to C10-aryl, R13 and R14 independently of one another represent unsubstituted or substituted C1- to C10-alkyl or unsubstituted or substituted C6- to C10-aryl or R13 and R14 together represent unsubstituted or substituted C3- to C10-alkylene, y denotes the numerical values 0, 1 or 2 and B1 represents, independently, hydrogen, optionally halogenated C2- to C8-alkyl, unsubstituted or substituted C6- to C10-aryl.

B1 preferably represents, independently, hydrogen; ethyl, n- or iso-propyl, which can be substituted by halogen; C6- to C10-aryl, in particular phenyl or naphthyl, unsubstituted or substituted by C1- to C4-alkyl and/or by halogen.

Alkyl in R11, R12, R13 and R14 preferably represents, independently, methyl, ethyl, n-propyl, isopropyl, n-, iso-, sec or tert-butyl, pentyl or hexyl.

Substituted alkyl in R11, R12, R13 and R14 preferably represents, independently, halo-substituted C1- to C10-alkyl, in particular mono- or di-substituted methyl, ethyl, n-propyl, isopropyl, n-, iso-, sec or tert-butyl, pentyl or hexyl.

C6- to C10-aryl in R11, R12, R13 and R14 preferably represents, independently, phenyl, naphthyl or binaphthyl, in particular o-phenyl, o-naphthyl, o-binaphthyl, which can be substituted (generally mono-, di- or tri-substituted) by halogen.

R13 and R14, together with the oxygen atoms to which they are directly bonded and the phosphorus atom, can form a ring structure.

There are mentioned, for example and preferably: 5,5,5',5',5'',5''-hexamethyltris(1,3,2-dioxaphosphorinane-methane)amino-2,2,2''-trioxide of formula (Va-1)

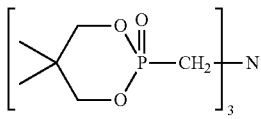

1,3,2-dioxaphosphorinane-2-methanamine, N-butyl-N[(5,5-dimethyl-1,3,2-dioxaphosphorinan-2-yl)methyl]-5,5-dimethyl-, P,2-dioxide; 1,3,2-dioxaphosphorinane-2-methanamine, N-[[5,5-dimethyl-1,3,2-dioxaphosphorinan-2-yl)methyl]-5,5-dimethyl-N-phenyl-, P,2-dioxide; 1,3,2-dioxaphosphorinane-2-methanamine, N,N-dibutyl-5,5-dimethyl-, 2-oxide, 1,3,2-dioxaphosphorinane-2-methanimine, N-[(5,5-dimethyl-1,3,2-dioxaphosphorinan-2-yl)methyl]-N-ethyl-5,5-dimethyl-, P,2-dioxide, 1,3,2-dioxaphosphorinane-2-methanamine, N-butyl-N-[(5,5-dichloromethyl-1,3,2-dioxaphosphorinan-2-yl)-methyl]-5,5-di-chloromethyl-, P,2-dioxide, 1,3,2-dioxaphosphorinane-2-methanamine, N-[(5,5-di-chloromethyl-1,3,2-dioxoaphosphorinan-2-yl)methyl]-5,5-di-chloromethyl-N-phenyl-, P,2-dioxide; 1,3,2-dioxaphosphorinane-2-methanamine, N,N-di-(4-chlorobutyl)-5,5-dimethyl-2-oxide; 1,3,2-dioxaphosphorinane-2-methanimine, N-[(5,5-dimethyl-1,3,2-dioxaphosphorinan-2-yl)methane]-N-(2-chloroethyl)-5,5-di(chloromethyl)-, P2-dioxide.

Also preferred are:
compounds of formula (Va-2) or (Va-3)

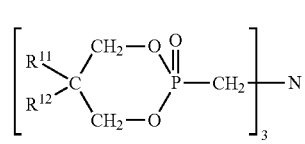

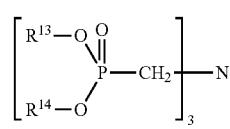

wherein

R11, R12, R13 and R14 have the meanings given above.

Particular preference is given to compounds of formula (Va-2) and (Va-1). The preparation of the phosphonate amines is described, for example, in U.S. Pat. No. 5,844,028.

Phosphazenes are compounds of formulae (VIa) and (VIb)

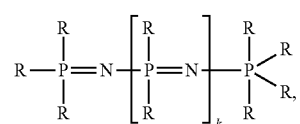

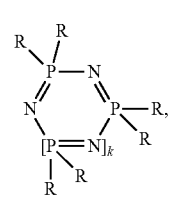

wherein

R is in each case the same or different and represents amino; C1- to C8-alkyl or C1- to C8-alkoxy each optionally halogenated, preferably halogenated with fluorine; C5- to C6-cycloalkyl, C6- to C20-aryl, preferably phenyl or naphthyl, C6- to C20-aryloxy, preferably phenoxy, naphthyloxy, or C7- to C12-aralkyl, preferably phenyl-C1-C4-alkyl, each optionally substituted by alkyl, preferably C1- to C4-alkyl, and/or by halogen, preferably chlorine and/or bromine, k represents 0 or a number from 1 to 15, preferably a number from 1 to 10.

Examples which may be mentioned include propoxyphosphazene, phenoxyphosphazene, methylphenoxyphosphazene, aminophosphazene and fluoroalkylphosphazene. Phenoxyphosphazene is preferred.

The phosphazenes can be used alone or as a mixture. The radical R can always be the same or two or more radicals in formula (VIa) and (VIb) can be different. Phosphazenes and their preparation are described, for example, in EP-A 728 811, DE-A 1 961668 and WO 97/40092.

The flameproofing agents can be used alone or in an arbitrary mixture with one another or in admixture with other flameproofing agents.

In addition, in a preferred embodiment flame-protected compositions comprise the above-mentioned flameproofing agents in combination with at least one antidripping agent selected from the substance classes of the fluorinated polyolefins, the silicones and also aramid fibres. Polytetrafluoroethylene polymers are particularly preferably used as antidripping agents.

The moulding compositions prepared by the process according to the invention can be used in the production of moulded bodies of any kind. These can be produced by injection moulding, extrusion and blow moulding processes. A further form of processing is the production of moulded bodies by deep drawing from previously produced sheets or films.

Examples of such moulded bodies are films, profiles, casing parts of any kind, for example for domestic appliances such as juice extractors, coffee makers, mixers; for office equipment such as monitors, flat screens, notebooks, printers, copiers; sheets, tubes, conduits for electrical installations, windows, doors and further profiles for the construction sector (interior fitting and outside applications) as well as parts for electronics and electrical engineering, such as switches, plugs and sockets, body and interior components for commercial vehicles, in particular for the automotive sector.

The moulding compositions prepared by the process according to the invention can in particular be used, for example, also for the production of the following moulded bodies or mouldings: Parts for the interior finishing of railway vehicles, ships, aircraft, buses and other motor vehicles, casings for electrical devices containing small transformers, casings for devices for disseminating and transmitting information, casings and coverings for medical devices, massage devices and casings therefor, toy vehicles for children, prefabricated wall panels, casings for security devices, heat-insulated transport containers, mouldings for sanitary and bathroom fittings, cover grids for ventilator openings, and casings for garden equipment.

The moulding compositions prepared by the process according to the invention are suitable in particular also for the production of moulded bodies or mouldings with a class-A-surface requirement and a high-gloss finish, which have optionally been subjected partially or completely to a further surface treatment step by, for example, painting, in-mould decoration, metallisation by vacuum deposition or galvanisation.

Within the scope of the present invention, "high-gloss" is understood as meaning a gloss level, determined in reflection according to DIN 67530 at a measuring angle of 60°, of at least 95, preferably of at least 97, particularly preferably of at least 99. Accordingly, the invention also provides moulded bodies or mouldings produced from the compositions according to the invention having a full or partial high-gloss finish, which have optionally been subjected to a further surface treatment step by, for example, painting, in-mould decoration, metallisation by vacuum deposition or galvanisation.

Accordingly, the invention also provides moulded bodies or mouldings produced from the compositions prepared by the process according to the invention having a full or partial high-gloss finish, which have optionally been subjected partially or completely to a further surface treatment step by, for example, painting, in-mould decoration, metallisation by vacuum deposition or galvanisation.

Component A1

Linear polycarbonate based on bisphenol A having a weight-average molecular weight $M_w$ of 28 kg/mol (determined by GPC in methylene chloride at 25° C. with polycarbonate as standard).

Component B1

Precompound, in granulate form, of 50 wt. % of a graft polymer of the ABS type, prepared by the emulsion polymerisation process, having an A:B:S ratio of 12:50:38 wt. %, and 50 wt. % of a styrene-acrylonitrile copolymer, prepared by the mass polymerisation process, having a styrene-acrylonitrile ratio of 76:24 wt. %, and having a weight-average molecular weight $M_w$, measured by GPC with polystyrene as standard in dimethylformamide at 20° C., of 100 kg/mol. Component B1 comprises, as a result of its preparation, 900 mg/kg of the precipitating agent magnesium sulfate used in the coagulation of the prepolymer. The magnesium sulfate is present, according to evidence obtained by scanning electron microscopy (SEM) coupled with energy-dispersive X-ray spectroscopy (EDX), in crystalline domains having a size of in some cases up to more than 100 μm.

The determination of the magnesium sulfate content in component B1 was carried out by a quantitative determination of the sulfate ion content and the conversion thereof to magnesium sulfate, because a determination is not possible from the magnesium content due to a lack of selectivity for MgSO4. To that end, about 1 g of component B1 was weighed accurately; 25 ml of analytical-grade acetone were added, and the mixture was treated in an ultrasound bath for 30 minutes. The resulting suspension was made up to 200 ml with Millipore water and shaken thoroughly. The suspension so treated was subjected to membrane filtration. The sulfate ion content was determined in the filtrate by ion chromatography using a DIONEX DX 600 ion chromatograph (DIONEX) (separating column: IonPac AS 11, 4×250 mm (DIONEX); mobile phase: gradient NaOH, c=0.004/0.076 mol/l; flow rate: 1.8 ml/min; autosampler temperature: 23° C.; column temperature: 35° C.; suppression: electrochemical, ASRS 300, 4 mm; detection: conductivity).

Component B2 n-Butyl acrylate-modified graft polymer of the ABS type, prepared by the mass polymerisation process, having an A:B:S ratio of 21:10:65 wt. % and having an n-butyl acrylate content of 4 wt. %. The D50 value of the graft particle diameter, determined by ultracentrifugation, is 0.5 ml. The graft base underlying the graft polymer is a styrene-butadiene block copolymer rubber (SBR). The gel content of the graft polymer, measured in acetone, is 20 wt. %. The weight-average molecular weight $M_w$, measured by GPC with polystyrene as standard in dimethylformamide at 20° C., of the free n-butyl acrylate-modified SAN, that is to say that is not chemically bonded to the rubber or included in the rubber particles in an acetone-insoluble form, is 110 kg/mol.

Component B3

Styrene-acrylonitrile copolymer, prepared by the mass polymerisation process, having a styrene:acrylonitrile ratio of 76:24 wt. % and a weight-average molecular weight $M_w$, measured by GPC with polystyrene as standard in dimethylformamide at 20° C., of 100 kg/mol.

Component C1

Pentaerythritol tetrastearate as lubricant/demoulding agent

Component C2

Phosphorous acid ester of bis-(2-hydroxy-3-cyclohexyl-5-methyl-phenyl)-methane having the formula

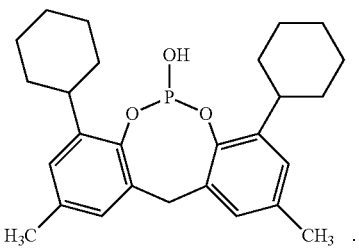 [SMILES: Cc1cc2c(c(C3CCCCC3)c1)OP(O)Oc1c(cc(C)cc1C1CCCCC1)C2]

Component C3

Heat stabiliser, Irganox 1076, BASF (Ludwigshafen, Germany)

The compositions of the examples and comparative examples given in Table 1 all comprise 60.35 parts by weight of component A1
23.16 parts by weight of component B1
8.90 parts by weight of component B2
6.53 parts by weight of component B3
0.74 part by weight of component C1
0.12 part by weight of component C2
0.20 part by weight of component C3 and differ only in the process used for their preparation.

Production of the Test Specimens and Testing

The compositions were prepared on an Evolum® 32 HT twin-shaft extruder from Clextral (France) with a length-to-diameter ratio L/D=36 at a melt temperature of 280 to 290° C. and with application of a low pressure of 100-200 mbar (absolute).

Component B1 was used on the one hand in the untreated state (C1) and on the other hand after previously being placed in contact with liquid water for different times and at different temperatures (C2 and Examples 1, 2 and 7) or alternatively after being exposed to air atmospheres of different relative humidities (C3, C5 and C6 and Examples 3-6 and 8). The details are to be found in Tables 1 and 2. In the cases where component B1 was placed in contact with liquid water, the granulate was sieved after the treatment and then used in superficially wetted form in the final compounding step. In the cases where component B1 was placed in contact with air atmospheres of different relative humidities, the product so treated was superficially dry and was used in that state in the final compounding step.

In Example 7, the precompound B1 was passed through a water bath during its preparation in order to solidify it and was then not, as is conventional, dried fully by blowing with air, but was left in the superficially moist state (wetted with water) and stored in that state in a silo for 3 days at 20° C. before being used in the final compounding step.

The water absorption of component B1 in these processes was determined gravimetrically and in the case of the examples according to the invention is from 0.2 to 1.1 wt. %, based on component B1.

In comparative example C4, a partial amount of the precompound B1 of 6 parts by weight, based on the sum of A to C, was replaced, according to the process described in EP 2 398 842 A1, by a mixture of 50 wt. % of the pulverulent emulsion ABS graft polymer used in the preparation of precompound B1 and 50 wt. % of the styrene-acrylonitrile copolymer used in the preparation of precompound B1, the pulverulent emulsion ABS graft polymer was treated with 10 parts by weight, based on the sum of the pulverulent emulsion ABS graft polymer and water, of liquid water, the wetted pulverulent emulsion ABS graft polymer was mixed with components C1 to C3, which were likewise pulverulent, to form a powder mixture, and the remaining components of the composition were added to the mixture in the final compounding step.

The granulates resulting from the compounding in each case were processed on an injection moulding machine (Arburg) at melt temperatures of 260° C. and a mould temperature of 80° C. to form sheets measuring 150 mm×105 mm×2 mm. A high-gloss polished mould was used.

The sheets were exposed to an air atmosphere having a relative humidity of 95% for 3 days at 40° C.

A visual appraisal was then made by 3 independent experts according to the following basis of assessment:

++ no blisters at all or only occasional very small blisters
+ some very small, but not disturbing blisters,
− a large number of very small blisters and/or only occasional larger blisters
−− a large number of larger blisters In addition, a quantitative evaluation of the defects according to the number, type and size was made by means of light microscopy using the differential interference contrast (DIC) method and digital image acquisition using a Zeiss Axioplan microscope with 100× magnification in reflected-light mode. Half of the surface of the sheet was examined on one side for blisters. A blister was defined as a fault in the surface which represents a solely positive topography change, that is to say an elevation above the normal surface level without any accompanying depressions in the surface profile. The evaluation was made from the calculated individual diameters d of the individual blister defects by determining the maximum blister diameter dmax and the relative defect area Arel, based on the size of the examined surface according to the formula $$A_{rel} = \Sigma(\pi d^2/4)/(0.5 \cdot 150 \text{ mm} \cdot 105 \text{ mm}),$$

where $\Sigma$ represents the sum of all defects with blister topography.

The examples and comparative examples are summarised in Tables 1 and 2. The data show that only the moulding compositions prepared by the process according to the invention exhibit the improved surface properties after storage under warm moist conditions according to the object of this invention and in that respect are suitable for the production of moulded bodies having an age-resistant, visually defect-free class A surface.

TABLE 1

|  | Examples |||||||||||
|  | C1 | C2 | 1 | 2 | C3 | 3 | 4 | 5 | 6 | C4 | 7 |
| Process |
| Contact of B1 with liquid water |  | x | x | x |  |  |  |  |  |  | x |
| Contact of B1 with moist air |  |  |  |  | x | x | x | x | x |  |  |
| Water added to the ABS powder |  |  |  |  |  |  |  |  |  | x |  |
| Temperature during the treatment [° C.] |  | 40 | 40 | 40 | 85 | 85 | 85 | 40 | 40 |  | 20 |
| Relative humidity of the air [%] |  |  |  |  | 95 | 95 | 95 | 95 | 95 |  |  |
| Duration of the treatment [h] |  | 3 | 24 | 72 | 3 | 24 | 72 | 24 | 72 |  | 72 |
| Properties |
| Visual assessment | −− | −− | + | +/++ | − | ++ | ++ | + | ++ | −− | +/++ |

TABLE 2

| | Examples | | | | | |
|---|---|---|---|---|---|---|
| | C1 | 2 | 8 | C4 | C5 | C6 |
| Process | | | | | | |
| Contact of B1 with liquid water | x | | | | | |
| Contact of B1 with moist air | | x | | | x | x |
| Water added to the ABS powder | | | | x | | |
| Temperature during the treatment [° C.] | | 40 | 95 | | 40 | 95 |
| Relative humidity of the air [%] | | | 100 | | 100 | 100 |
| Duration of the treatment [h] | | 72 | 72 | | 4 | 4 |
| Properties | | | | | | |
| Visual assessment | -- | +/++ | ++ | -- | -- | -- |
| Microscopic evaluation | | | | | | |
| Max. blister diameter $d_{max}$ [μm] | 383 | 225 | 276 | 332 | 287 | 452 |
| Relative defect area $A_{rel}$ [ppm by area] | 87 | 6 | 16 | 83 | 139 | 88 |

The invention claimed is:

1. A process for preparing a composition comprising:
A) from 0 to 98 parts by weight, based on the sum of A and B, of a thermoplastic polymer other than B or of a mixture of a plurality of thermoplastic polymers other than B, and
B) from 2 to 100 parts by weight, based on the sum of A and B, of
B1) at least one graft polymer prepared by an emulsion polymerisation process,
B2) optionally at least one graft polymer prepared by a mass, suspension and/or solution polymerisation process,
B3) optionally at least one rubber-free vinyl (co)polymer, and
C) from 0 to 30 parts by weight, based on the sum of A and B, of at least one polymer additive,
wherein the sum of the parts by weight of A and B is 100, wherein
(i) component B comprises at least one inorganic salt comprising a cation selected from the group consisting of the alkali metals, alkaline earth metals and aluminium and an anion selected from the group consisting of chloride, sulfate, nitrate, phosphate, acetate and formate, in a concentration of from 100 to 5000 mg/kg, based on the total composition, and
a) in a first process step, the totality of the salt-containing component is treated completely with water by contacting said component with liquid water and/or with a water-vapour-containing atmosphere,
b) in a second process step, melting and kneading the component that has been treated with water, and
c) optionally in a third process step, mixing the component with remaining components of the composition, and melting and kneading the mixture, and thereby dispersing the components of the mixture in one another,
wherein at least in one of b) or c) a low pressure of at least 200 mbar is applied, and water introduced into the process in a) is thereby removed.

2. The process according to claim 1, wherein exposure time of said salt-containing component B in a) to water and/or water vapour is at least 10 hours and not more than 500 hours.

3. The process according to claim 1, wherein said salt-containing component B is in granulate form.

4. The process according to claim 1, wherein in a) the totality of said salt-containing component is treated with water by a water-vapour-containing atmosphere comprising a relative humidity of at least 70%.

5. The process according to claim 1, wherein treatment with liquid water takes place at a temperature range of from 5 to 95° C., and treatment with a water-vapour-containing atmosphere takes place at a temperature range of from 20 to 95° C.

6. The process according to claim 1, wherein said salt-containing component B has a water content after treatment of from 0.10 to 1.8 wt.%, based on component B.

7. The process according to claim 1, wherein said composition comprises:
A) from 30 to 85 parts by weight of said component A, based on the sum of A and B,
B) from 15 to 70 parts by weight of said component B, based on the sum of A and B,
C) from 0.3 to 7 parts by weight of said component C, based on the sum of A and B.

8. The process according to claim 1, wherein said salt is an alkali, alkaline earth or aluminium chloride or an alkali, alkaline earth or aluminium sulfate, and/or a mixture thereof.

9. The process according to claim 1, wherein said salt is magnesium sulfate.

10. The process according to of claim 1, wherein treatment with a water-vapour-containing atmosphere takes place at a temperature of from 20 to 95° C. and at a relative humidity of at least 70%.

11. The process according to claim 1, wherein said composition comprises as component C at least one selected from the group consisting of flameproofing agents, flameproofing synergists, smoke-inhibiting additives, antidripping agents, internal and external lubricants and demoulding agents, flowability aids, antistatics, conductivity additives, UV stabilisers, light stabilisers, heat stabilisers, antioxidants, transesterification inhibitors, hydrolytic stabilisers, additives comprising antibacterial action, additives that improve scratch resistance, IR absorbers, optical brighteners, fluorescent additives, fillers and reinforcing materials, acids, colourants and pigments.

12. The process according to claim 1, wherein the totality of components A and C and residual amounts of component B are added to the composition in (b) and are dispersed in one another by kneading, and water introduced into said process in a) is removed by applying a low pressure of at least 200 mbar.

13. The process according to claim 1, wherein said component B comprises at least two components selected from the group consisting of B1, B2 and B3.

14. A composition prepared by a process according to claim 1.

15. A moulded body and/or moulding produced from a polymer composition prepared by a process of claim 1 comprising a class A surface and a partial or full high-gloss finish, wherein the gloss level in high-gloss regions is at least 95, determined in reflection according to DIN 67530 at a measuring angle of 60°, which can optionally be subjected partially or completely to a further surface treatment step optionally by, painting, in-mould decoration, metallisation by vacuum deposition and/or galvanisation.

* * * * *